(12) United States Patent
Donner et al.

(10) Patent No.: US 6,420,697 B1
(45) Date of Patent: Jul. 16, 2002

(54) STEERING ANGLE SENSOR

(75) Inventors: Harald Donner, Meinerzhagen; Ralf Böbel, Dortmund; Jürgen Kieselbach, Wutha-Farnrode; Jens Hannemann, Eisenach, all of (DE)

(73) Assignees: Leopold Kostal GmbH & Co., Wiesenstrasse; PWB-Ruhlatec Industrieprodukte GmbH, Seebach, both of (DE)

( * ) Notice: Subject to any disclaimer, the term of this patent is extended or adjusted under 35 U.S.C. 154(b) by 26 days.

(21) Appl. No.: 09/654,494

(22) Filed: Sep. 1, 2000

(30) Foreign Application Priority Data

Sep. 6, 1999 (DE) .......................................... 199 42 477

(51) Int. Cl.⁷ ................................................ G01D 5/34
(52) U.S. Cl. .............................. 250/231.14; 250/231.17
(58) Field of Search ......................... 250/231.1, 231.13, 250/231.14, 231.15, 231.16, 231.17, 231.18; 341/13, 31

(56) References Cited

U.S. PATENT DOCUMENTS 5,243,188 A * 9/1993 Hattori et al. ......... 250/231.16
5,841,132 A * 11/1998 Horton et al. ......... 250/213.13
6,130,425 A * 10/2000 Sano ....................... 250/231.14
6,144,027 A * 11/2000 Weber .................... 250/231.14
6,248,993 B1 * 6/2001 Bunselmeier et al. .. 250/231.13

* cited by examiner

Primary Examiner—Stephone Allen
(74) Attorney, Agent, or Firm—Brooks & Kushman, P.C.

(57) ABSTRACT

A steering wheel angle sensor includes first and second sensors, a differential gear, and a detector. The first sensor determines steering wheel angular position within one revolution and the second sensor determines number of steering wheel revolutions. The first sensor has a first rotor carrying a first coding. The first rotor and the first coding rotate as the steering wheel rotates. The second sensor has a second rotor and a second coding movable by the second rotor. The gear includes driving, reference, and planetary wheels for coupling the rotors such that the rotors rotate at different speeds with respect to one another as the steering wheel rotates. The second rotor engages with a pivoted lever into an arm carrying the second coding such that the second coding pivots as the second rotor rotates. The detector scans the first coding within an angular segment of the steering wheel range of rotation as the first coding rotates. The detector scans the second coding within the steering wheel range of rotation as the second coding pivots while the second rotor rotates in order to determine the angular position of the steering wheel.

13 Claims, 2 Drawing Sheets

STEERING ANGLE SENSOR

TECHNICAL FIELD

The invention pertains to a steering angle sensor for determining the absolute angular position of the steering wheel of a motor vehicle, with a first sensor unit consisting of a sensor that carries a first coding and is coupled to the rotational movement of the steering wheel as well as a detection device that is arranged on the side of the stator and serves for scanning the coding of the sensor within an angular segment of the entire range of rotation of the steering wheel, and with a second sensor unit consisting of a rotor that is coupled to the sensor of the first sensor unit via corresponding gears, a coding that can be moved by the rotor and a detection device that is arranged on the side of the stator and serves for scanning this coding within the entire range of rotation of the steering wheel.

BACKGROUND ART

The steering angle or the steering angle deflection in motor vehicles is, for example, required in driving dynamics control systems. Such a driving dynamics control system receives other measuring data in addition to the aforementioned steering angle values, e.g., the rotational speed of the wheels or the turning of the motor vehicle about its vertical axis. In this case, the absolute steering angle deflection as well as the steering speed are required for evaluating these values by the driving dynamics control system together with the other measured data, with said data subsequently being used for controlling actuators, e.g., the brakes and/or the engine management system.

A steering angle sensor of the initially mentioned type is known from DE 44 09 892 A1. The first sensor unit of this steering angle sensor, the sensor of which is directly coupled to the rotational movement of the steering wheel in the form of a rotor, carries out an angular measurement within one revolution of the steering wheel (360°), i.e, within an angular segment of the entire range of rotation of the steering wheel which amounts to four revolutions of the steering wheel (1440°) for the object of this document. The second sensor unit serves for counting the revolutions so as to provide information as to the fact within which revolution of the entire range of revolution of the steering wheel the current angular position measured with the first sensor unit is located. This is the reason why the rotor of the second sensor unit is designed for measuring the entire range of rotation of the steering wheel which amounts to 1440° within 360°. For this purpose, the rotor of the second sensor unit is driven by the rotor of the first sensor unit similar to a planetary gear with a step-down ratio of 4:1. The axes of rotation of the two rotors are arranged concentric to one another such that the rotors of both sensor units are arranged in one plane. The inner rotor is connected to the steering spindle such that both parts rotate together, i.e., this rotor drives the outer rotor of the second sensor unit via the planetary gear when the steering wheel is turned.

In order to realize this step-down gear in the described fashion, the planetary wheel used needs to have certain dimensions. The concentric arrangement between the steering spindle, the rotor of the first sensor unit and the rotor of the second sensor unit as well as the arrangement of the planet wheel cause this steering angle sensor to circumferentially require a significant installation space in the radial direction referred to the steering axis. Consequently, it is not always easily possible to arrange this steering angle sensor in a steering column module; this also applies to the arrangement of the steering angle sensor in a lower region of the steering spindle, e.g., above the pedals.

The sensor units of this known steering angle sensor utilize a magnetic coding similar to a Gray code as the coding and Hall sensors which are circumferentially arranged on the side of the stator, i.e., distributed over 360°, as the detection devices that scan the magnetic coding. Each sensor unit contains such a Hall sensor arrangement.

SUMMARY OF THE INVENTION

Based on this state of the art, the present invention aims to propose a steering angle sensor of the initially mentioned type which is not only optimized with respect to the required installation dimensions, but can also be realized with a lower expenditure of hardware without having to accept disadvantages regarding the functionality of the steering angle sensor.

According to the invention, this objective is attained due to the fact that the detection device of the first sensor unit is realized in the form of a sensor array with a series of converter elements that adjoin one another, and due to the fact that this sensor array is arranged such that the coding of the sensor of the first sensor unit as well as the coding of the second sensor unit can be scanned, with the sensor of the first sensor unit being realized in the form of a code disk, with the sensor array being arranged such that its longitudinal extent lies transverse to the moving direction of the coding of the code disk and its converter elements point to the flat side of the code disk which carries the coding, and with a differential planetary gear being provided for realizing the coupling of the rotor of the second sensor unit to the sensor of the first sensor unit, wherein the planetary gear contains a driving wheel that is realized in the form of a translating gear wheel and meshes with the sensor of the first sensor unit as well as a stationarily arranged reference wheel of annular design which contains an internal gearing and is arranged adjacent to the driving wheel, wherein a planet wheel that is engaged with the internal wheel gearing as well as the rotor of the second sensor unit which is realized in the form of the driven wheel of the gear and contains a different number of cogs than the reference wheel is arranged between a pinion that is situated on the hub of the driving wheel and the internal gearing of the reference wheel, and wherein the rotor engages with a pivoted lever into a claw of an arm that carries the coding of the second sensor unit and is arranged in a pivoted fashion between the code disk that is realized in the form of a sensor and the sensor array.

The steering angle sensor according to the invention contains two sensor units, with the different codings of both sensor units acting upon a common detection device. For this purpose, the detection device of the first sensor unit is realized in the form of a one-dimensional or two-dimensional coherent sensor array with a series of adjoining converter elements. The two sensor units preferably operate in an optoelectronic fashion, with the coding of the first sensor unit being formed by a code disk that is illuminated from one side, and with the sensor array that, for example, is realized in the form of a line sensor being arranged on the side of the code disk which is situated opposite to the light source such that its photosensitive surface points to the code disk.

The sensor which carries the coding of the first sensor unit may, for example, consist of a rotor that is directly coupled to the rotational movement of the steering spindle, e.g., a circular code disk or a sensor element that is translationally moved referred to the rotational movement. In the latter instance, the sensor element is coupled to the rotational movement of the steering spindle by means of a gear coupling, e.g., a gear train. If the sensor is realized in the form of a code disk, the coding of this code disk may, for example, contain an Archimedean spiral that is realized in the form of a light slot, with a circular reference track that is arranged centrally referred to the code track being assigned to the code track in order to increase the measuring accuracy. This reference track may be realized in the form of a light slot analogous to the code track or consist of the circumferential edge of the code disk. Instead of utilizing light slots, the tracks—code track and reference track—may also be realized in the form of black tracks that stand in contrast to an otherwise transparent code disk.

In the step-down gear, the rotor of the second sensor unit is coupled to the sensor of the first sensor unit which, in turn, is coupled to the movement of the steering wheel. The rotor of the second sensor unit contains a pivoted lever that engages into a claw of an arm that carries the coding of the second sensor unit and is arranged in a pivoted fashion between the code disk that forms the sensor and the sensor array. In this case, a movement of the driven rotor results in a pivoting movement of the arm, the coding of which acts upon different regions of the sensor array within the entire range of rotation of the steering wheel, namely in accordance with the angular position of the steering wheel. The maximum travel of the arm of the second sensor unit may correspond to no more than the longitudinal extent of, for example, a line sensor used. Since the movement of the driven rotor can only amount to a short distance for this reason, the step-down ratio between the sensor of the first sensor unit and the rotor of the second sensor unit needs to be correspondingly high. For this purpose, one utilizes a differential planetary gear that contains a driving wheel which is realized in the form of a translating gear wheel and meshes with the sensor of the first sensor unit that, for example, is realized in the form of a rotor as well as a reference wheel. The reference wheel has an annular design, contains an internal gearing and is arranged on the side of the frame. A pinion that is coupled to the movement of the driving wheel via a planet wheel situated between the pinion and the reference wheel is arranged on the hub of the driving wheel. The rotor of the second sensor unit represents the driven wheel of this gear arrangement and is driven by the planet wheel, with the number of cogs of the driven rotor differing from that of the reference wheel. When designing such a planetary gear, it is practical for space reasons to arrange the driving wheel and the driven wheel inside one another, with the reference wheel that contains the internal gearing being stationarily arranged concentric to and within the driving wheel, and with the internal gearing of the reference wheel surrounding the driven rotor.

The use of only one detection device for both sensor units causes the number of required detection devices to be reduced in comparison to the state of the art. The arrangement of the gear coupling in the described fashion, in which the two rotors are, in contrast to the state of the art, not arranged concentric to one another, but rather adjacent to one another, means that a greater installation depth than the radial installation depth of the first sensor unit is only required radially of the rotational axis of the first sensor unit in one region, namely in the region in which the planetary gear is arranged. Only the installation depth defined by the first sensor unit is required in the remaining sections of the steering angle sensor.

BRIEF DESCRIPTION OF THE DRAWINGS

Additional characteristics of the invention are disclosed and described below with reference to one embodiment that is illustrated in the enclosed figures. The figures show.

BEST MODE FOR CARRYING OUT THE INVENTION

Figure 1:
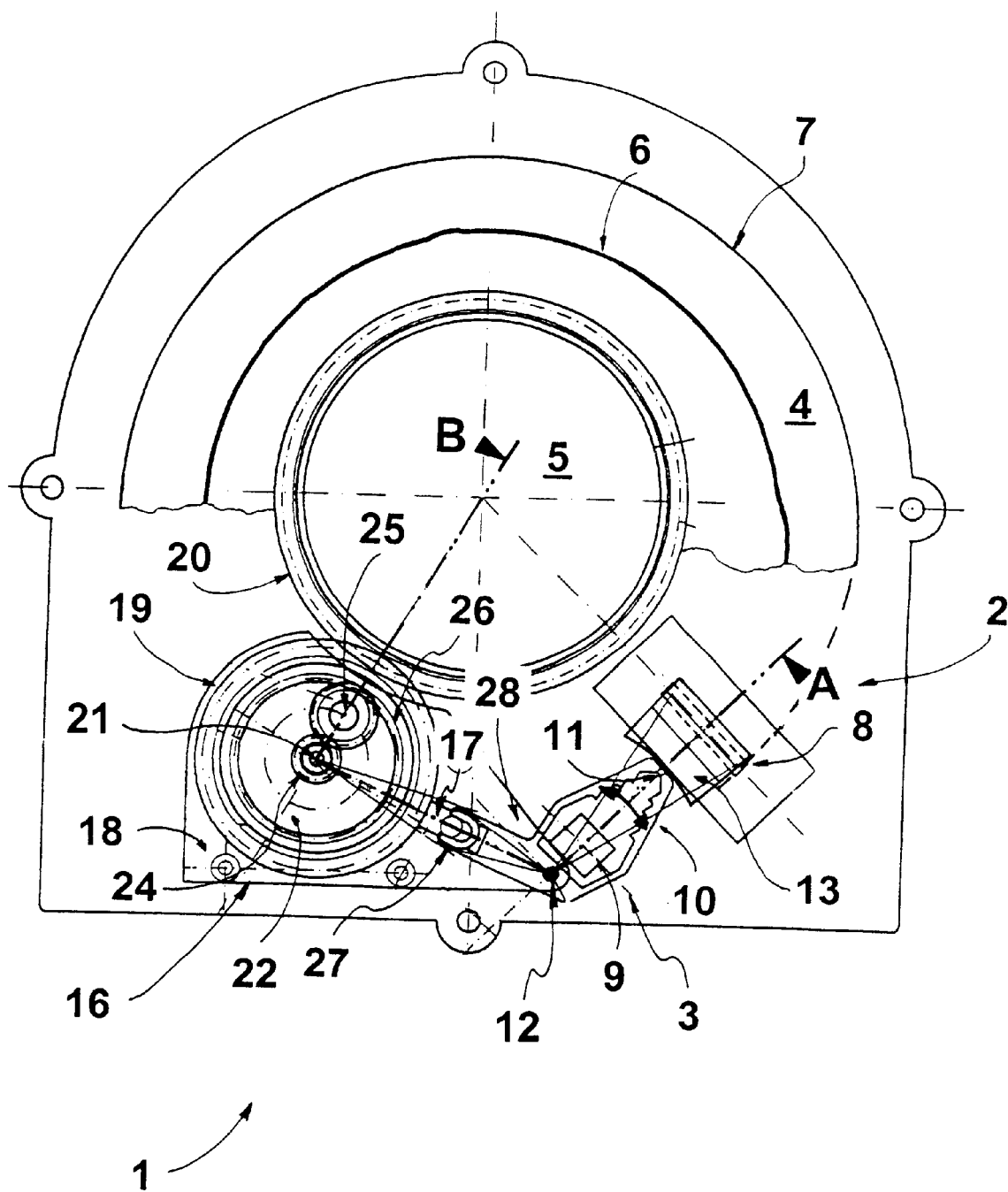
FIG. 1, a schematic top view of a steering angle sensor.

An optoelectronic steering angle sensor 1 contains two sensor units 2, 3. The sensor unit 2 consists of a code disk 4 that serves as the rotational sensor of the first sensor unit and is connected to the steering spindle 5 of a motor vehicle such that they rotate together. The code disk 4 carries a code track 6 that is realized in the form of a light slot and represents an Archimedean spiral that appears in the form of a black line in the figure. The outer edge 7 of the code disk 4 serves as a reference track. The sensor unit 2 also contains a line sensor 8 with a series of optoelectronic converter elements. The alignment of the line sensor 8 extends radially to the rotational axis of the steering spindle. The photosensitive surface of the line sensor 8 faces the lower side of the code disk 4. The length of the line sensor 8 or the length of the converter elements, respectively, extends over the region of the code track 6 in the radial direction and beyond the outer edge 7 of the code disk 4 such that the outer edge 7 projected onto the line sensor 8 can be used as a reference track. In relation to the code disk 4, the line sensor 8 is arranged opposite to an illumination device, identified by the reference symbol 15 in FIG. 2, which illuminates the code disk 4 from the top.

The sensor unit 3 contains a light source 9 that is arranged in a diaphragm 10. On its front side, the diaphragm 10 has a diaphragm opening 11 such that a light beam is able to emerge from the diaphragm 10. The diaphragm 10 can be pivoted about a pivoting axis 12 as indicated by the double arrow such that the light beam emerging from the diaphragm opening 11 is able to act upon different converter elements of the line sensor 8 depending on the position of the diaphragm 10. An optical element 13 with a reflective surface 14 for deflecting the light beam is arranged above the line sensor 8 in order to deflect the light beams which emerge from the diaphragm opening 11 in a plane parallel to the plane of the code disk 4 into the plane, in which they act upon the line sensor 8. The projection of the code track 6 of the first sensor unit 2 as well as the projection of the light beam of the second sensor unit 3 which emerges from the diaphragm opening 11 act upon the same sector of the line sensor 8.

Figure 2:
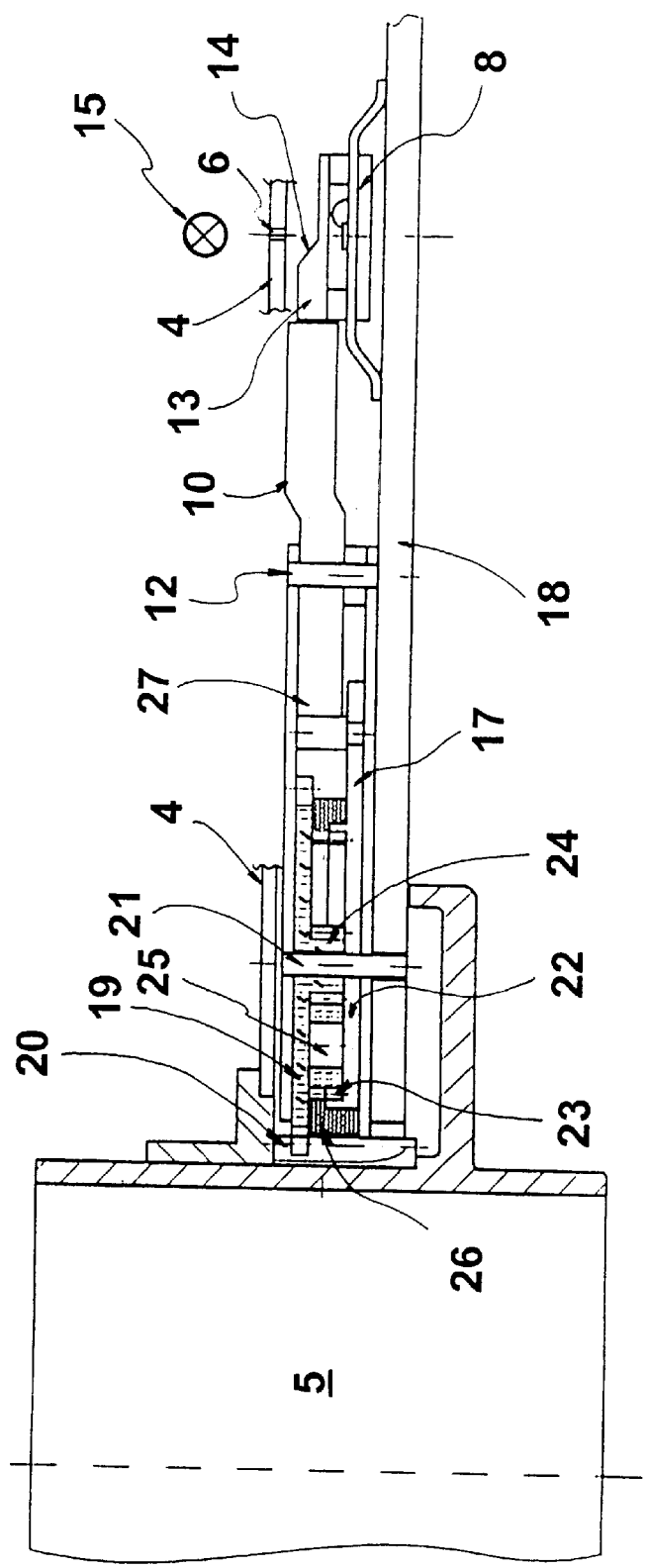
FIG. 2, a section along the line A–B through the steering angle sensor according to FIG. 1.

The arrangement of the two sensor units 2, 3 can also be ascertained from the sectional representation in FIG. 2 which also schematically shows the light source 15 arranged above the code disk 4.

The sensor unit 2 serves for measuring the angular position of the steering wheel or the steering spindle 5, respectively, within a segment of 360° of an assumed total range of rotation of the steering wheel of four revolutions (1440°). The sensor unit 3 serves for measuring the position of the steering spindle 5 within the entire range of rotation of the steering wheel of 1440°. For this purpose, the movement of the diaphragm 10 is designed such that, during a rotation by 1440°, the light beam which emerges from the diaphragm opening 11 and represents the coding of the sensor unit 3 travels over the entire photosensitive surface of the line sensor 8. The movement of the diaphragm 10 is coupled to the rotational movement of the code disk 4 or the steering spindle 5, respectively, via a gear 16 and a pivoted arm 17. The gear 16 consists of a differential planetary gear 16, the components of which are arranged on a frame plate 18. The planetary gear 16 consists of a driving wheel 19 that is engaged with a toothed wheel 20 which is connected to the steering spindle 5 such that they rotate together. A driven wheel 22 which forms the rotor of the second sensor unit 3 is arranged on the axis 21 of the driving wheel 19, with said driven wheel being realized in the form of a hollow wheel and containing an internal gearing 23. A planet wheel 25 is situated between the internal gearing 23 and a pinion 24 that is also arranged on the axis 21 between the driving wheel 19 and the driven wheel 22. The gear 16 also contains an annular reference wheel 26 that is provided with an internal gearing and arranged adjacent to the driving wheel 19, with the reference wheel being arranged stationarily referred to the frame. The planet wheel 25 is engaged with the internal gearing of the reference wheel 26 as well as the internal gearing 23 of the driven wheel 22, with the reference wheel 26 containing a different number of cogs than the driven wheel 22.

During a movement of the driving wheel 19, the rotational movement is transmitted to the driven wheel 22 via the pinion 24 and the planet wheel 25, with the pivoted arm 17 being arranged on the outer periphery of the driven wheel. Due to the different number of cogs, the simultaneous meshing of the planet wheel 25 with the internal gearing of the reference wheel 26 and the internal gearing of the driven wheel 22 causes a pivoting of the driven wheel 22 such that this movement results in a pivoting movement of the arm 17. The pivoting arm 17 is inserted into a claw 27 that forms part of a two-armed lever 28 with its free end. The lever axis of this two-armed lever coincides with the pivoting axis 12, with the diaphragm 10 representing the other arm of the lever 28. This means that a rotational movement of the driven wheel 22 which serves as the rotor of the second sensor unit 3 results in the above-described pivoting movement of the diaphragm 10.

The pivoting arm 17 may operate against the force of a spring element in order to reduce the gear play.

In instances, in which the sensor of the first sensor unit carries out a translational movement as a result of a steering spindle movement, the drive of the planetary gear is, for example, realized with the aid of a toothed rack instead of the toothed wheel 20 illustrated in the figures.

A code track-selective measurement of the coding 6 of the sensor unit 2 and the coding 11 of the sensor unit 3 can be realized differently. For example, an alternative measurement of one or the other code track may be carried out. In order to differentiate the two codings 6, 11, coded light may act upon the line sensor, with, for example, a wavelength-dependent, brightness-dependent or polarization-dependent differentiation being possible. In addition to the aforementioned physical separation of the code tracks, a differentiation between both code tracks 6, 11 may also be carried out with the aid of algorithms. Such a separation may, for example, be achieved by means of a redundant information code such that a definitive statement regarding the position of the respective code tracks 6, 11 and consequently the angular position of the steering wheel is also possible if the line sensor 8 is simultaneously illuminated with both code tracks 6, 11.

List of Reference Symbols
 1 Steering angle
 2 First sensor unit
 3 Second sensor unit
 4 Code disk, sensor realized in the form of a rotor
 5 Steering spindle
 6 Code track
 7 Outer edge of the code disk
 8 Line sensor
 9 Light source
 10 Diaphragm
 11 Diaphragm opening
 12 Pivoting axis
 13 Optical element
 14 Reflective surface
 15 Light source
 16 Gear
 17 Pivoted arm
 18 Frame plate
 19 Driving wheel
 20 Toothed wheel
 21 Axis
 22 Driven wheel, rotor
 23 Internal gearing
 24 Pinion
 25 Planet wheel
 26 Reference wheel
 27 Claw
 28 Two-armed lever

What is claimed is:

1. A steering angle sensor for determining an absolute angular position of a steering wheel of a motor vehicle, the steering angle sensor comprising:
    a first sensor unit having a first rotor carrying a first coding, the first rotor being coupled to the steering wheel to rotate therewith such that the first coding rotates as the steering wheel rotates, the first sensor unit being adapted for determining an angular position of the steering wheel within one revolution of the steering wheel;
    a second sensor unit having a second rotor and a second coding movable by the second rotor, the second sensor unit being adapted for determining a number of revolutions of the steering wheel;
    a differential planetary gear coupling the second rotor to the first rotor such that the first and second rotors rotate at different speeds as the steering wheel rotates, the planetary gear including a driving wheel, a reference wheel, and a planetary wheel, the driving wheel meshing with the first rotor to rotate as the first rotor rotates, the reference wheel including an internal wheel gearing and arranged adjacent to the driving wheel to rotate as the driving wheel rotates, the reference wheel having a given number of cogs, the planetary wheel being engaged with the internal wheel gearing of the reference wheel and the second rotor to rotate as the reference wheel rotates, the planetary wheel containing a different number of cogs than the reference wheel, the planetary wheel being arranged between a pinion situated on an axis of the driving wheel and the internal wheel gearing of the reference wheel; and
    a detection device;
    wherein the second rotor engages with a pivoted lever into a claw of an arm carrying the second coding, such that the second coding pivots as the second rotor rotates;
    wherein the detection device is operable for scanning the first coding within an angular segment of the range of rotation of the steering wheel as the first coding and the first rotor rotate and for scanning the second coding within the range of rotation of the steering wheel as the second coding pivots while the second rotor rotates in order to determine the absolute angular position of the steering wheel.

2. The steering angle sensor of claim 1 wherein:

the first rotor is a code disk.

3. The steering angle sensor of claim 1 wherein:

the driving gear wheel is a driving translating gear wheel.

4. The steering angle sensor of claim 1 wherein:

the arm is under the influence of a spring biased with a prestressive force.

5. The steering angle sensor of claim 1 wherein:

the first rotor describes a rotational movement directly coupled to the rotational movement of the steering spindle.

6. The steering angle sensor of claim 1 wherein:

the first and second codings act upon different sectors of the detection device.

7. The steering angle sensor of claim 1 wherein:

the first and second codings act upon the same sector of the detection device.

8. The steering angle sensor of claim 1 wherein:

the detection device includes a sensor array with a series of adjoining converter elements.

9. The steering angle sensor of claim 8 wherein:

the detection device is arranged such that its longitudinal extent lies transverse to a moving direction of the first coding and the converter elements point to a flat side of the first rotor provided with the first coding.

10. The steering angle sensor of claim 1 wherein:

the driving wheel, the reference wheel, and the second rotor form a cylindrical unit, the plan surfaces of which respectively include one lateral surface of the driving wheel and the second rotor with the cylindrical surface being formed by an annular surface of the reference wheel.

11. The steering angle sensor of claim 10 wherein:

the second coding includes a diaphragm movable relative to a stationary light source.

12. The steering angle sensor of claim 1 wherein:

the first and second rotors include optoelectronic sensor units, with the first coding having a code track and a reference track, and with the second coding having a coding movable over the detection device in response to movement of the arm.

13. The steering angle sensor of claim 12 wherein:

an optical element is arranged above the detection device with a light beam from the optical element being movable in response to the pivoting of the second coding which is laterally coupled into the optical element and reflected to the detection device.

* * * * *